United States Patent
Boutte

(10) Patent No.: US 6,467,399 B1
(45) Date of Patent: Oct. 22, 2002

(54) MEAT AND POULTRY ROASTER

(76) Inventor: Charles M. Boutte, 6304 Bocage St., Shreveport, LA (US) 71119

( * ) Notice: Subject to any disclaimer, the term of this patent is extended or adjusted under 35 U.S.C. 154(b) by 0 days.

(21) Appl. No.: 09/658,089

(22) Filed: Sep. 8, 2000

Related U.S. Application Data

(60) Provisional application No. 60/153,213, filed on Sep. 13, 2000.

(51) Int. Cl.[7] ................................................ A47J 43/18
(52) U.S. Cl. ....................... 99/347; 99/421 V; 99/426; 99/446
(58) Field of Search ............................... 99/419, 421 V, 99/426, 446, 346, 647, 345

(56) References Cited

U.S. PATENT DOCUMENTS

| | | | |
|---|---|---|---|
| 3,053,169 A | 9/1962 | Rappaport | 99/421 |
| 4,450,759 A | 5/1984 | Steibel | 99/419 |
| 5,069,117 A | 12/1991 | Schlessel | 99/419 |
| 5,081,916 A | 1/1992 | Kuhling et al. | 99/419 |
| 5,106,642 A | 4/1992 | Ciofalo | 426/509 |
| 5,301,602 A | 4/1994 | Ryczek | 99/345 |
| 5,893,320 A | 4/1999 | Demaree | 99/419 |
| 6,119,585 A * | 9/2000 | Guidry | 99/347 X |
| 6,125,739 A * | 10/2000 | Jernigan | 99/347 X |
| 6,192,792 B1 * | 2/2001 | Gremillion | 99/426 |

* cited by examiner

Primary Examiner—Reginald L. Alexander
(74) Attorney, Agent, or Firm—John M. Harrison

(57) ABSTRACT

A meat and poultry roaster which is characterized by a one-piece drip pan or bowl and marinade container, wherein the marinade container extends upwardly from the center of the drip pan for supporting the meat or poultry in an upright position in an oven or cooker, and contains marinade for seasoning the meat or poultry. The drip pan or bowl and marinade container may be constructed of a rigid metal such as stainless steel and aluminum heat-resistant glassware or plastic, or it may be built of a flexible, disposable material such as aluminum foil.

6 Claims, 2 Drawing Sheets

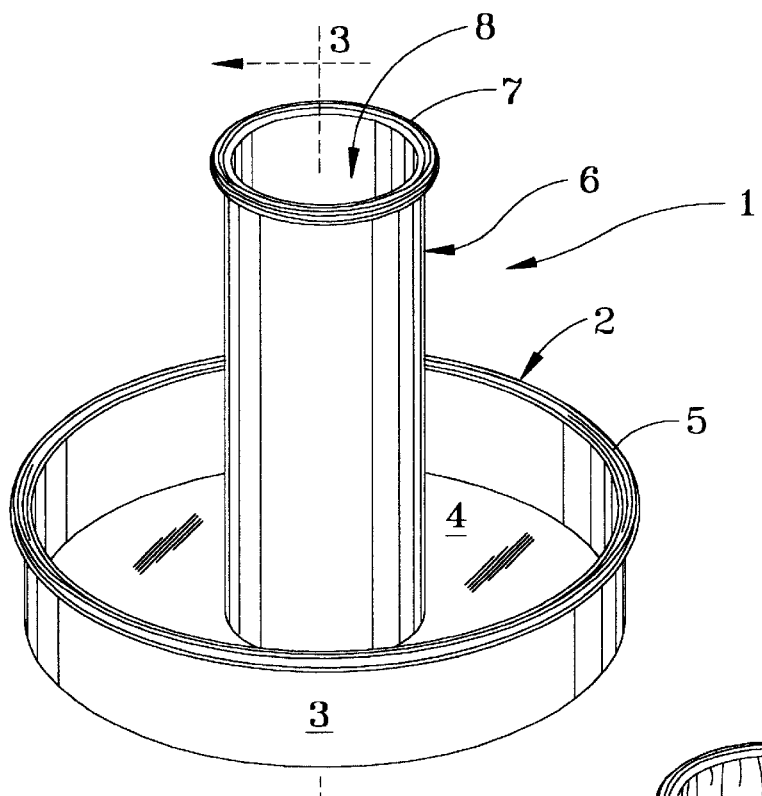
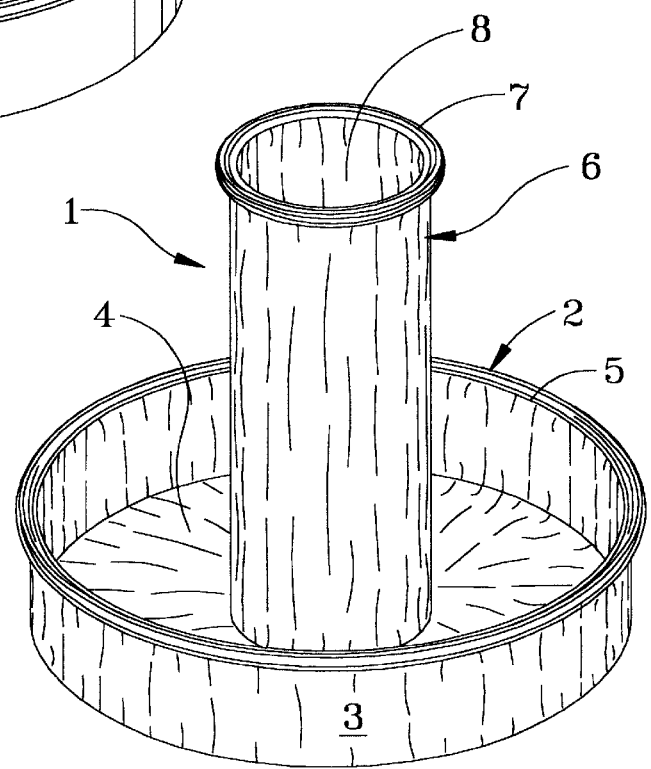

MEAT AND POULTRY ROASTER

CROSS-REFERENCE TO RELATED APPLICATIONS

This application claims the benefit of copending U.S. Provisional Application Ser. No. 60/153,213, filed Sep. 13, 2000.

BACKGROUND OF THE INVENTION

1. Field of the Invention

This invention relates to cooking devices for meat and fowl and more particularly, to a meat and poultry roaster which is characterized by a one-piece drip pan or bowl and marinade container, which marinade container is upward-standing in the approximate center of the drip pan or bowl for containing marinade and supporting the meat and poultry in an upright position in an oven, barbecue pit, smoker or other cooker. The meat and poultry roaster can be constructed of a rigid metal such as aluminum, stainless steel, microwave and oven-proof glassware or plastic or the like, or a flexible, disposable material such as aluminum foil.

It has long been recognized that in the cooking of meat, particularly turkey, chicken and other poultry, great difficulty is experienced in allowing the desired spicing and flavoring to penetrate the meat from the inside to the outside in order to impart the desired flavor and tenderness to the meat. There is a great tendency to overcook the outer portions of the poultry and meat without completely cooking the interior portions. To achieve the end of flavoring the meat and cooking the meat from the inside to the outside, various techniques have been employed, including stuffing the cavity of the poultry with various vegetables and flavorings. However, this technique suffers from the disadvantage of non-uniform application of heat generally to the outside only of the poultry, typically by using a standard barbeque pit cooker, oven or the like. Consequently, as the heat is applied to the outside of the poultry it tends to overcook the outside and undercook the inside, and does not render the flavoring and tenderness to the poultry in an optimum manner. Another expedient for cooking meat and poultry is the insertion of spikes or nails throughout the poultry to transmit heat from the cooker to the meat. However, these metal spikes or nails typically have a heat conductivity which is greater than that of the meat or poultry, and therefore tend to effect cooking in localized areas around the extension of the spike or nail, rather than throughout the meat itself. The present invention includes the use of a drip pan with an upward-standing marinade container which extends approximately from the center thereof and is of sufficient size and shape to extend into the cavity of a turkey, chicken or other meat and facilitate the introduction of marinade vapors and flavorings deposited in the marinade container, throughout the meat from the inside out. An added advantage of this cooker is the facility for collecting the drippings which may include fat, flavoring and other liquids from the meat into the drip pan, without allowing the drippings to fall on the charcoal or the burners of a barbeque pit or the electric elements of an oven.

2. Description of the Prior Art

Various supports or stands are well-known in the art for supporting poultry in an oven or cooker. Typical of these supports is the "Heat Disseminating Multiple Spit Assembly and Stand" described in U.S. Pat. No. 3,053,169, dated Sep. 11, 1962, to Bernard B. Rappaport. The device is characterized by a base or stand which rests on an oven rack, and three elongated rods having tapered upper ends are upward-standing from the base for impaling the poultry. The rods extend through the hub of a spit unit provided with multiple arms which extend outwardly therefrom, and potatoes or other fruits or vegetables can be inserted on the tapered extending ends of the arms for roasting inside the oven with the poultry. U.S. Pat. No. 4,450,759, dated May 29, 1984, to James P. Steibel, discloses a "Stand for Fowl Roasting", characterized by two elongated plates each having a slot for receiving the other plate in perpendicular, intersecting relationship. The assembled stand rests on a support surface inside an oven or cooker and receives the cavity of a fowl, to support the fowl in an upright position as the fowl is roasted on the stand. A "Multi-Purpose Poultry Roaster and Baking Rack" is disclosed in U.S. Pat. No. 5,069,117, dated Dec. 3, 1991, to Walter Schlessel. The roaster includes a drip pan and an assembly of wires which is shaped into multiple skewers upward-standing from the drip pan. An upward-standing prong is formed in the central portion of the wire assembly for receiving meats such as poultry, while potatoes, apples or other fruits or vegetables can be inserted and baked on the peripheral skewers of the wire assembly. U.S. Pat. No. 5,081,916, dated Jan. 21, 1992, to Franz Kuhling, et al., describes a "Support Element, Clamp Element and Stop Element for the Preparation and/or Implementation of a Cooking Process of Pieces of Meat, Especially Poultry". The support element is characterized by a wire network which is shaped into a conical support structure having a generally cylindrical base section, and second and third cylindrical sections which taper upwardly from the base section. The junction of the first and second sections defines a shoulder on which the cooking fowl rests after the upward-standing support receives the cavity of the fowl. A "Roasting Support for Fowl" is detailed in U.S. Pat. No. 5,106,642, dated Apr. 21, 1992, to Robert Ciofalo. The support includes a base member and a conical plug member which is upward-standing from the base member for sealingly engaging one of the open cavity ends of the disemboweled fowl. The support further includes an elevated support member which extends from the conical plug member and is adapted to support the other open cavity end of the fowl at a higher level than the first cavity end of the fowl, to facilitate retention of fluids inside the fowl during roasting. U.S. Pat. No. 5,301,602, dated Apr. 12, 1994, to Wlodzimierz Ryczek, details a "Fat-Free Roaster for Poultry and Meat", characterized by a pan which includes a detachable glass liquid reservoir upward-standing from the center of the pan. A supply of meat flavoring or moisturizing liquid is contained in the reservoir, and the reservoir is inserted inside the poultry or meat being roasted to moisturize and flavor the cooking meat. A "Device for Cooking Fowl" is disclosed in U.S. Pat. No. 5,893,320, dated Apr. 13, 1999, to Michael S. Demaree. The device includes a cylindrical insert or mount that fits within the interior cavity of the fowl to be cooked. The insert or mount may be connected in upward-standing relationship to a base plate which supports the insert or mount and the supported fowl in an upright position, to promote drainage of exuded liquified fat from the fowl.

It is an object of this invention to provide a new and improved poultry roaster which includes a drip pan or bowl having a marinade container upward-standing at or near the center of the drip pan, which marinade container in a preferred embodiment is constructed of a single piece of material with the drip pan. The marinade container is designed not only to contain marinade and flavoring for flavoring the meat, but also to extend into the cavity of poultry such as chicken and turkey when the poultry is seated on the roaster inside an oven or cooker and effect flavoring and heating of the interior or the chicken and turkey or other poultry to facilitate cooking from the inside as well as the outside of the poultry.

Another object of this invention is to provide a meat and poultry roaster which is characterized by a one-piece combination drip pan or bowl and marinade container which extends upwardly from the center of the drip pan or bowl and is designed to contain marinade and to extend into the cavity of poultry such as chicken or turkey when the poultry is seated on the roaster, and effect flavoring and cooking of the poultry from the inside as well as the outside of the poultry when the meat and poultry roaster is placed in an oven or on a barbecue pit or grill.

Still another object of the invention is to provide a meat and poultry roaster which is characterized by a combination one-piece drip pan or bowl and marinade container that can be constructed of a metal such as stainless steel and aluminum, a disposable material such as aluminum foil or microwave-proof plastic and oven-proof glassware such as "PYREX" (trademark). The marinade container may be of any desired shape, but is preferably in the configuration of a cylinder and is designed not only to contain marinade but also to extend into the cavity of poultry such as a chicken or turkey when the poultry is seated on the roaster inside an oven or on a barbecue pit, grill or other cooker, to facilitate cooking of the chicken or turkey from the inside as well as the outside of the poultry and flavoring of the meat more efficiently.

SUMMARY OF THE INVENTION

These and other objects of the invention are provided in a new and improved meat and poultry roaster which is characterized by a drip pan or bowl and a cylindrical marinade container upward-standing from the drip pan, wherein the drip pan and the marinade container are constructed of a single piece of material. In a preferred embodiment the marinade container and drip pan or bowl are constructed of a rigid, heat-resistant material such as stainless steel, aluminum or the like, and in another embodiment these elements are constructed of aluminum foil, such that they can be disposed of after the cooking. Other materials of construction are heat-resistant glassware and microwave-compatible plastic. The marinade container is designed to receive marinade and to extend into the meat or poultry as the poultry is seated on the roaster inside an oven or on a barbecue pit grill or other cooker, to facilitate cooking and infusing the flavoring from the inside as well as the outside the meat or poultry. The drip pan or bowl is designed to receive drippings of fat, marinade and other liquid and to prevent this liquid from contaminating the barbeque pit grill or oven.

BRIEF DESCRIPTION OF THE DRAWINGS

The invention will be better understood by reference to the accompany drawings, wherein:

FIG. 1 is a perspective view of a first preferred embodiment of the meat and poultry roaster, wherein the drip pan or bowl marinade container are constructed of a rigid, heat-resistant metal, glass or plastic material;

FIG. 2 is a perspective view of the meat and poultry roaster, wherein the drip pan and marinade container are constructed of aluminum foil.

DESCRIPTION OF THE PREFERRED EMBODIMENTS

Figure 3:
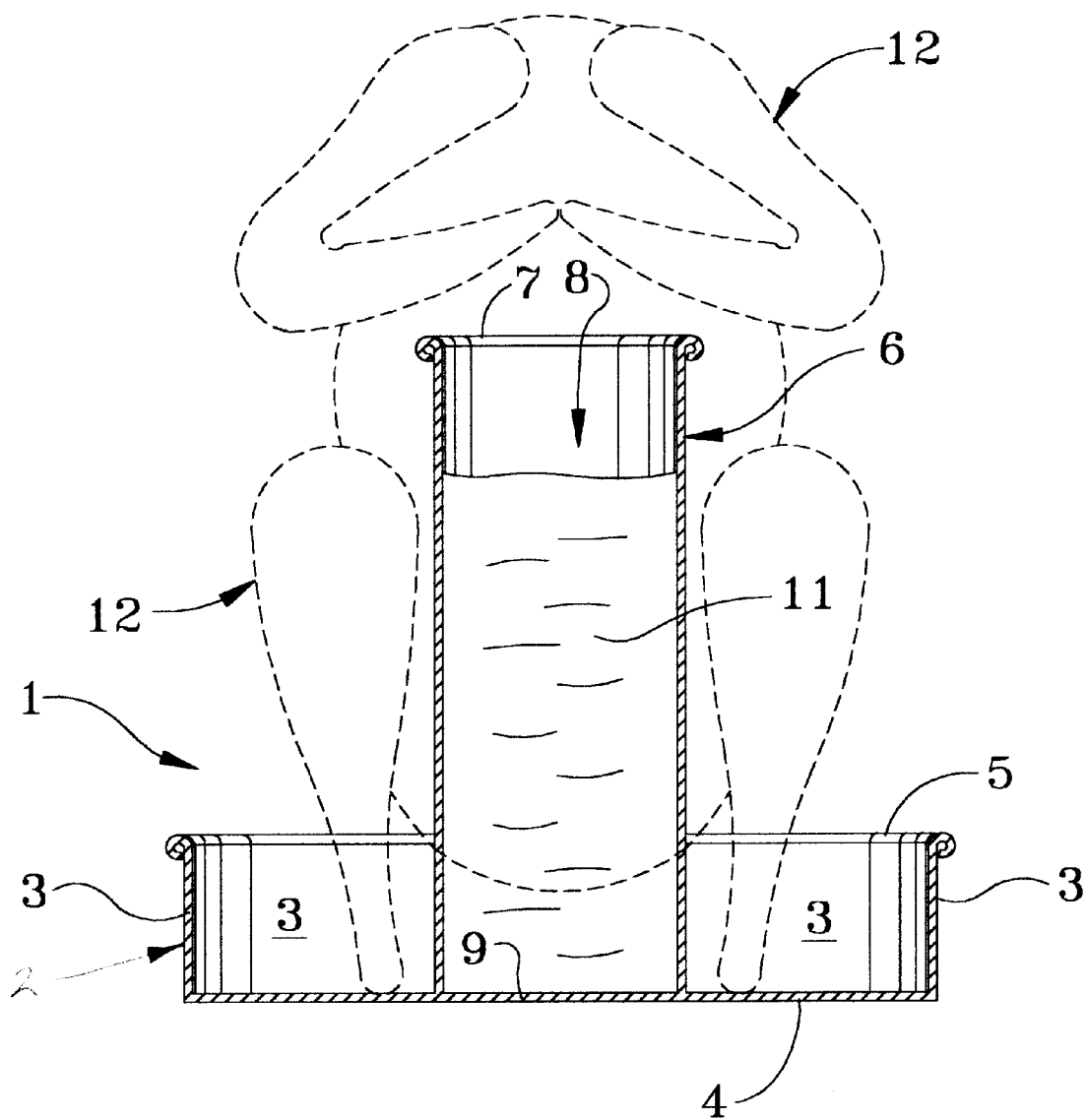
FIG. 3 is a sectional view, taken along line 3—3 of the meat and poultry roaster illustrated in FIG. 1, more particularly illustrating the one-piece construction of the drip pan or bowl and marinade container, as well as a supply of marinade provided in the marinade container and a poultry seated on the meat and poultry roaster in cooking configuration.

Referring initially to FIGS. 1–3 of the drawings, the meat and poultry roaster of this invention is generally illustrated by reference numeral 1. The meat and poultry roaster 1 illustrated in FIGS. 1 and 3 includes a drip pan or bowl 2 and a marinade container 6, which are typically constructed in one piece of a rigid, heat-resistant material such as stainless steel and aluminum or microwave and heat-resistant plastic or glassware, or the like. The drip pan 2 is characterized by a pan side 3 which may be curved to define an annulus as illustrated in FIG. 1, but may be an alternative bowl shape, as desired. A pan bottom 4 closes the pan side 3, and the upward-standing pan side 3 terminates in an open pan edge 5, as illustrated. The marinade container 6 is typically cylindrical in configuration but may be in other shapes as desired, and is upward-standing from the pan bottom 4, preferably in a one-piece construction with respect to the drip pan 2, as illustrated in FIG. 3. The marinade container 6 has a container bore 8 which typically has a substantially uniform diameter throughout the length of the marinade container 6. The upper end of the marinade container 6 is typically characterized by a container edge 7, and the container bore 8 is closed at the container bottom 9 by the pan bottom 4, which container bottom 9 is thus coplanar and continuous with the pan bottom 4 of the drip pan 2 and maintains the marinade 11 at a desired level inside the marinade container 6. In operation of the meat and poultry roaster 1 as hereinafter further described, the marinade container 6 is extended into the cavity or internal area of the poultry 12 as the poultry 12 is lowered and seated on the marinade container 6 and drip pan 2.

Referring again to FIG. 2 of the drawings, in another preferred embodiment of the invention the drip pan 2 and marinade container 6 are constructed of aluminum foil of sufficient strength and rigidity to maintain structural integrity when the poultry 12 (illustrated in FIG. 3) is seated on the marinade container 6 and drip pan 2, as illustrated in FIG. 3. Consequently, after the cooking operation is complete and the poultry 12 is removed from the marinade container 6, the meat and poultry roaster 1 illustrated in FIG. 2 can be washed and re-used or crumpled into a ball and discarded, as desired.

In detailed operation, the meat and poultry roaster 1 illustrated in FIGS. 1–3 is utilized by initially placing a supply of marinade 11 in the marinade container 6, as illustrated in FIG. 3. Meat such as chicken, turkey or other poultry 12 is then lowered and seated on the marinade container 6 and pan bottom 4 of the drip pan 2, with the marinade container 6 extending into the cavity of the poultry 12 in the position illustrated in phantom in FIG. 3. The meat and poultry roaster 1, along with the poultry 12, is then placed in a barbeque pit grill, oven, smoker or other cooker for a desired length of time to facilitate cooking and infusion flavoring of the interior of the poultry 12 by boiling of the marinade 11 in the marinade container 6, as well as cooking of the poultry 12 from the outside due to the ordinary convection heat of the barbeque pit grill, oven or cooker. This cooking technique facilitates both tenderizing and flavoring as well as cooking of the poultry 12 from the inside out, as well as cooking of the poultry 12 from the outside in, in conventional fashion.

The volume or quantity of marinade 11 placed in the marinade container 6 depends upon the size of the meat or poultry 12 placed on the meat and poultry roaster 1, and can be determined by experimentation. It is understood by those skilled in the art that various formulations of marinade 11 may be utilized in the marinade container 6, according to the individual desires of the user.

One of the primary features of the meat and poultry roaster 1 of this invention is the construction of the drip pan 2 and the marinating container 6 in a single piece, from a variety of materials, which adds rigidity and structural integrity to the entire meat and poultry roaster 1. This construction is particularly desirable and necessary under circumstances where the meat and poultry roaster 1 is constructed of aluminum foil as illustrated in FIG. 2, to facilitate the necessary rigidity and structural integrity for supporting the poultry 12 in the upright position illustrated in FIG. 3.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A meat and poultry roaster comprising a drip pan and a marinade container upward-standing from said drip pan for containing marinade, said marinade container formed in one piece with said drip pan and said drip pan and said marinade container constructed of aluminum foil, wherein said drip pan and said marinade container are selectively re-used and said drip pan and said marinade container are selectively crumpled into a ball and discarded after use of said meat and poultry roaster.

2. The meat and poultry roaster of claim 1 wherein said marinade container has a substantially cylindrical configuration.

3. The meat and poultry roaster of claim 1 wherein said drip pan has a circular pan bottom and said marinade container has a container bottom coplanar and continuous with said pan bottom.

4. The meat and poultry roaster of claim 3 wherein said marinade container has a substantially cylindrical configuration.

5. A meat and poultry roaster comprising a drip pan having a circular, bowl bottom and a substantially cylindrical marinade container upward-standing from said bowl bottom of said drip pan, with said drip pan and said marinade container constructed of aluminum foil and said marinade container formed in one piece with said drip pan and having a container bottom coplanar and continuous with said bowl bottom; and a container bore traversing the length of said marinade container for containing marinade, said container bore having a substantially uniform diameter throughout the length of said marinade container, and wherein said drip pan and said marinade container are selectively re-used and said drip pan and said marinade container are selectively crumpled into a ball and discarded after use of said meat and poultry roaster.

6. A meat and poultry roaster comprising a drip pan having a circular pan bottom and a substantially cylindrical marinade container upward-standing from said pan bottom of said drip pan, said marinade container formed in one piece with said drip pan and having a container bottom coplanar and continuous with said pan bottom, wherein said drip pan and said marinade container are constructed of aluminum foil and said drip pan and said marinade container are selectively re-used and said drip pan and said marinade container are selectively crumpled into a ball and discarded after use of said meat and poultry roaster; and a container bore traversing the length of said marinade container for containing marinade, said container bore having a substantial uniform diameter throughout the length of said marinade container.

* * * * *